United States Patent
Aman et al.

[19]

[11] Patent Number: 6,067,580
[45] Date of Patent: May 23, 2000

[54] INTEGRATING DISTRIBUTED COMPUTING ENVIRONMENT REMOTE PROCEDURE CALLS WITH AN ADVISORY WORK LOAD MANAGER

[75] Inventors: Jeffrey D. Aman; Carl E. Clark; David B. Emmes, all of Poughkeepsie, N.Y.; Satwinder S. Kahlon, Austin, Tex.; Christopher Meyer, Apex, N.C.; Steven E. Rosengren, Round Rock, Tex.; Frank S. Samuel, Jr., Binghamton, N.Y.; Donald W. Schmidt, Stone Ridge, N.Y.; Thomas J. Szczgielski, Endicott, N.Y.

[73] Assignee: International Business Machines Corporation, Armonk, N.Y.

[21] Appl. No.: 08/814,872

[22] Filed: Mar. 11, 1997

[51] Int. Cl.$^7$ ...................................................... G06F 15/16
[52] U.S. Cl. ............................................ 709/330; 709/105
[58] Field of Search ..................................... 395/684, 675; 709/105, 304, 238–242

[56] References Cited

U.S. PATENT DOCUMENTS

| | | | |
|---|---|---|---|
| 4,649,473 | 3/1987 | Hammer et al. .................. | 395/200.43 |
| 4,825,354 | 4/1989 | Agrawal et al. ........................ | 707/10 |
| 5,056,003 | 10/1991 | Hammer et al. ....................... | 395/680 |
| 5,283,897 | 2/1994 | Georgiadis et al. .................... | 106/437 |
| 5,307,490 | 4/1994 | Davidson et al. ...................... | 395/684 |
| 5,504,894 | 4/1996 | Ferguson et al. ............................ | 707/2 |
| 5,524,253 | 6/1996 | Pham et al. .............................. | 709/202 |
| 5,740,437 | 4/1998 | Greenspan et al. ..................... | 709/104 |
| 5,761,507 | 6/1998 | Govett ..................................... | 395/684 |
| 5,774,668 | 6/1998 | Choquier et al. .................. | 395/200.53 |
| 5,781,703 | 7/1998 | Desai et al. ............................... | 706/50 |

*Primary Examiner*—Alvin E. Oberley
*Assistant Examiner*—St. John Courtenay, III
*Attorney, Agent, or Firm*—Whitham, Curtis & Whitham; Arthur J. Samodovitz, Esq.

[57] ABSTRACT

Distributed computing environment (DCE) remote procedure calls (RPCs) are integrated with an advisory work load manager (WLM) to provide a way to intelligently dispatch RPC requests among the available application server processes. The routing decisions are made dynamically (for each RPC) based on interactions between the location broker and an advisory work load manager. Furthermore, when the system contains multiple coupled processors (tightly coupled within a single frame, or loosely coupled within a computing complex, a local area network (LAN) configuration, a distributed computing environment (DCE) cell, etc.), the invention extends to balance the processing of RPC requests and the associated client sessions across the coupled systems. Once a session is assigned to a given process, the invention also supports performance monitoring and reporting, dynamic system resource allocation for the RPC requests, and potentially any other benefits that may be available through the specific work load manager (WLM).

6 Claims, 3 Drawing Sheets

INTEGRATING DISTRIBUTED COMPUTING ENVIRONMENT REMOTE PROCEDURE CALLS WITH AN ADVISORY WORK LOAD MANAGER

BACKGROUND OF THE INVENTION

1. Field of the Invention

The present invention generally relates to distributed data processing systems of the type referred to as client/server systems and, more particularly, to integrating distributed computing environment (DCE) remote procedure calls (RPCs) with an advisory work load manager (WLM) in a way that intelligently dispatches RPC requests among available application server processes.

2. Background Description

Client/server architecture makes use of the distributed intelligence of both the servers and workstations in a network to exploit the full computing power of both servers and workstations. This is done by splitting the processing of an application between two distinct components, the "front-end" client workstation and the "back-end" server. The client component can be a complete, stand-alone workstation or personal computer that offers a full range of power and features for running applications. The server component enhances the client component by providing additional computing power, allowing the client to off-load some of the computing burden. Thus, the client and server work together to accomplish the processing of the application, both increasing the processing power available and utilizing that power more efficiently. The client portion of the application is typically optimized for user interaction, while the server portion provides multiuser functionality.

Remote procedure calls (RPCs) in current client/server environments are serviced by a server whose process address is selected by a location broker (known as end point mapper located in the DCE Daemon (DCED) in a DCE implementation) without any attempt to account for system resources or activity. This can result in processing delays if the server selected is currently busy with an RPC from another client. Likewise, if an idle server is not selected, available resources are wasted. As a result, a number of load balancing schemes have been developed in order to balance the processing loads among servers, but these generally have been quite ineffective. Typically, the location broker provides addressing information (binding) for locating server processes on a particular host.

SUMMARY OF THE INVENTION

It is therefore an object of the present invention to provide a method of integrating distributed computing environment (DCE) remote procedure calls (RPCs) with an advisory work load manager (WLM) in a simple and effective manner.

For systems that allow multiple instances of the same server to be started, the invention provides a way to intelligently dispatch RPC requests among the available server processes. The routing decisions are made dynamically each time a binding is resolved based on interactions between the location broker and an advisory work load manager. Furthermore, when the system contains multiple coupled processors (tightly coupled within a single frame, or loosely coupled within a computing complex, a local area network (LAN) configuration, a distributed computing environment (DCE) cell, etc.), the invention extends to balance the processing of RPC requests and the associated client sessions across the coupled systems. Once a session is assigned to a given process, the invention also supports performance monitoring and reporting, dynamic system resource allocation for the RPC requests, and potentially any other benefits that may be available through the specific work load manager (WLM).

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
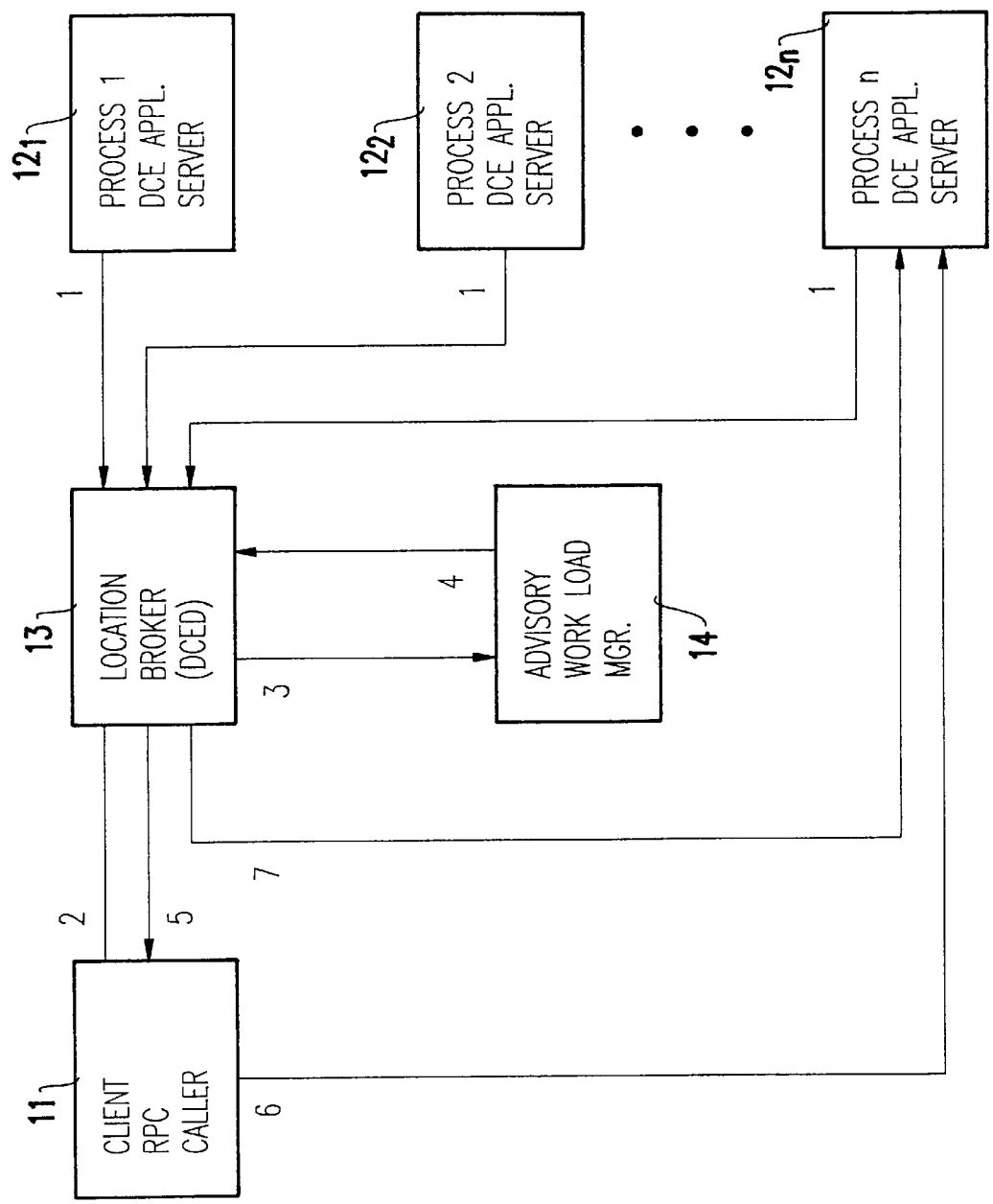
FIG. 1 is a simplified block diagram of a client/server system which implements a preferred embodiment of the present invention.

Referring now to the drawings, and more particularly to FIG. 1, there is shown in block diagram form a typical client/server architecture which implements the present invention. A single client 11 is shown for purposes of simplicity of illustration and description, but those skilled in the art will recognize that there will, in practice, be many clients. A plurality of servers $12_1$ to $12_n$ are available for servicing remote procedure calls (RPCs) from the client. The invention provides a way for routing RPC requests to the "best" server that may be available in the system, or in a network of systems. To this end, there is provided a location broker, or DCE Daemon (DCED), 13 and an advisory work load manager (WLM) 14.

The best way to describe the interactions of the basic components illustrated in FIG. 1 is via an example of the steps that take place when the client 11 makes an RPC call. Initially, the application servers $12_1$ to $12_n$ register their interfaces with the location broker (DCED) 13, as shown by step 1. This process is described in more detail below. During this phase, the advisory work load manager (WLM) 14 is made aware of this server instance. The client 11 makes an RPC request in which the target server's IP address and port number may or may not be known. Such requests implicitly get routed to the location broker 13, as shown by step 2. The location broker 13 consults the WLM 14 which determines which server would be the "best" in terms of performance and resource load balancing and provides the addressing information (of the "best" server) to the location broker 13. In the example illustrated in FIG. 1, the application server $12_n$ has been chosen. This is indicated in FIG. 1 by steps 3 and 4.

The following steps 5 and 6 refer to the case where the client is using a connection oriented protocol (also known as CO or CN, in which case communication takes place using TCP/IP protocol) and allowing DCE to implicitly resolve the binding to a server instance or the client is using a DCE function to explicitly resolve the binding. Where connection oriented protocol is used, or in the case of explicit binding resolution, the addressing information is routed to the client 11. With addressing now complete, the request is routed to the application server.

The next step 7 refers to the case where the client is using a connectionless protocol and allowing DCE to implicitly resolve the binding. In this case, the behavior for clients using the connectionless protocol (also known as Datagram or DG, where communication takes place using UDP/IP protocol) and allowing implicit resolution of the binding by DCE differs here, and the request is directly forwarded to the server (from the location broker 13) for processing. This process by which the location broker 13 forwards the request is called "call forwarding". When the server returns after finishing processing, the client 11 updates its addressing information for the server.

After the initial request processing by the server whose addressing information was provided by interaction of the location broker 13 and WLM 14, future requests by this client for the server will be directly routed to the same server, regardless of performance or work load characteristics. One exception to this situation is the case where the client takes explicit steps to clear out server address information, and in that case with server addressing information being incomplete, the request will get routed to the location broker 13 with the result that the steps described above will be repeated. The process of clearing the binding information is also an opportunity for re-balancing of the work load on the next RPC request using this binding.

Figure 2:
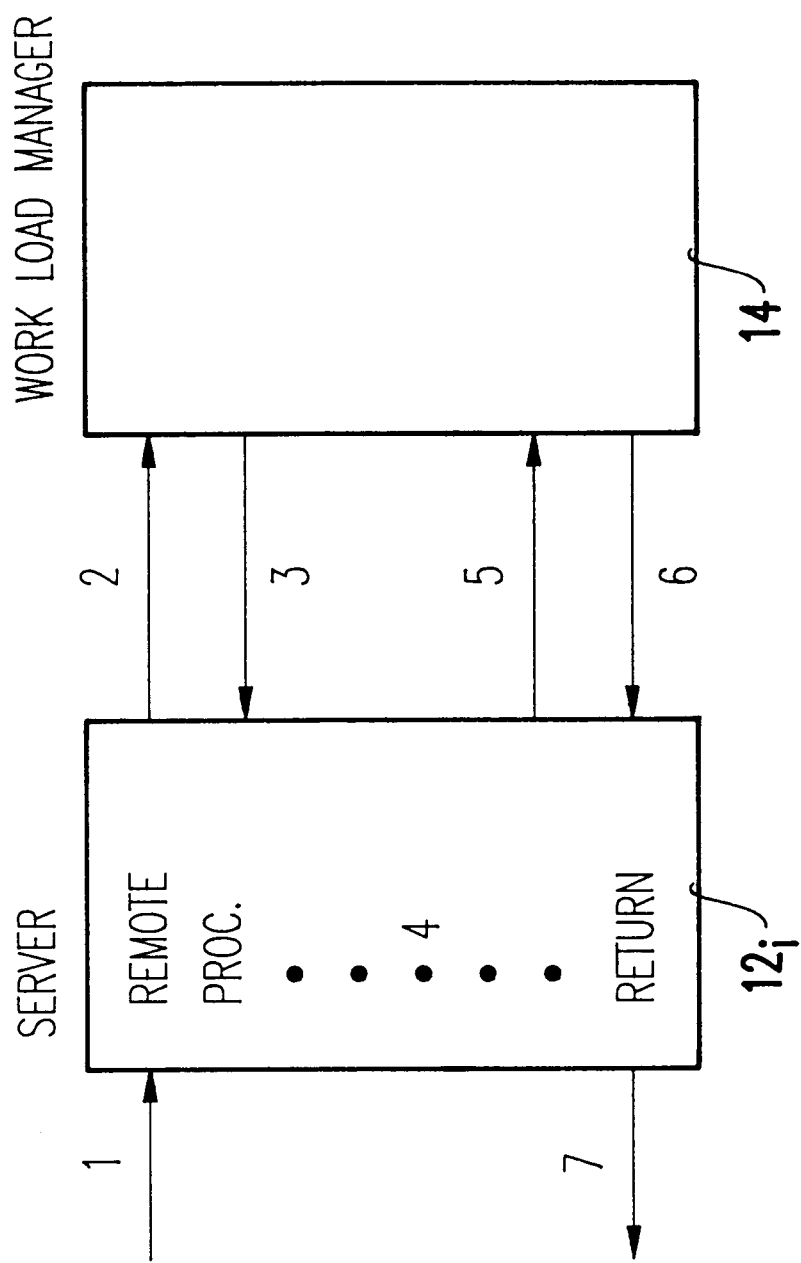
FIG. 2 is a block diagram illustrating the data flow of the server runtime and WLM interactions.

The work load manager (WLM) 14 is the one component that makes decisions on which may be the "best" server at a given time. This decision is based on data collected from servers that may be running, if any, along with other data related to individual systems and their workloads. These servers when processing an RPC request pass on relevant data to the WLM 14 which allows the WLM to make decisions. This interaction of server and WLM is illustrated in FIG. 2 and described below with reference to the numbered data flow arrows.

1. A remote procedure is invoked from the client, and the stub part of the remote procedure gets control and execution starts here.
2. In the stub, the WLM 14 is informed about the invocation and attributes associated with the call. In a practical implementation, this may not happen in the stub.
3. The WLM 14 registers attributes and returns control to the server.
4. The server $12_i$ executes the procedure and passes control back to the stub.
5. The stub in the server $12_i$ informs the WLM 14 that the remote procedure has been executed. The WLM can use this information for work load balancing or other purposes.
6. The stub gets control back from the WLM 14.
7. Finally, the stub returns control back to the caller (i.e., the client).

Figure 3:
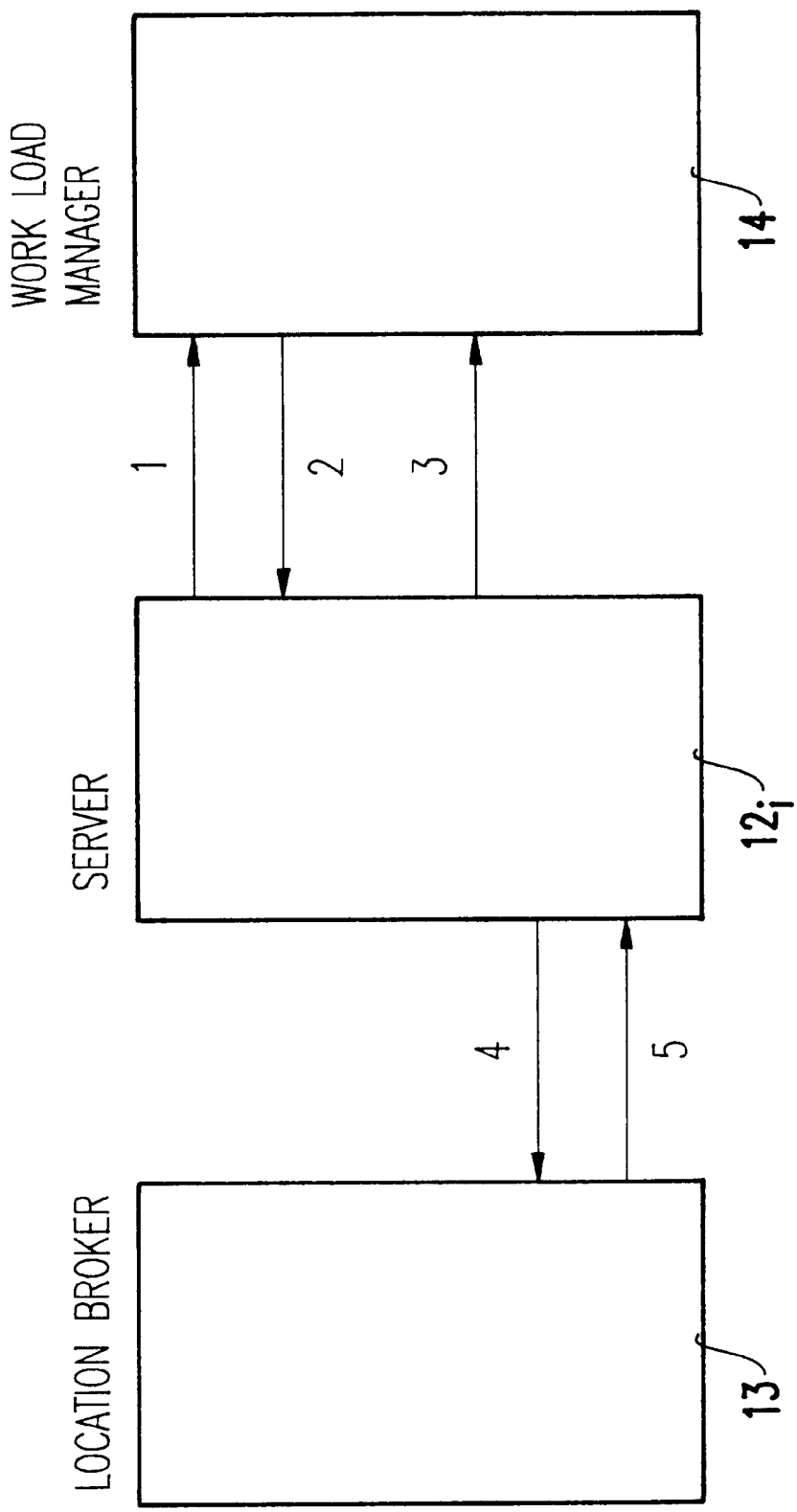
FIG. 3 is a block diagram illustrating the data flow of the server initialization.

Whenever the server (that can process the RPC request) gets started, it registers with the location broker 13. Now, keeping automatic selection/routing in mind, the server also needs to register itself with the WLM 14. This interaction is illustrated in FIG. 3 and described below with reference to the numbered data flow arrows.

1. The server $12_i$ inquires from the WLM 14 as to whether or not the server is managed by the WLM 14.
2. The WLM 14 informs the server $12_i$ if the server is WLM managed or not. If the server is not WLM managed, the server continues with normal registration with the location broker 13, and no registration takes place with the WLM 14.
3. If the server $12_i$ is WLM managed, the server registers with the WLM 14.
4. The server registers with the location broker 13.
5. The location broker 13 completes the registration.

With the help of the WLM 14, the location broker 13 can make decisions on where to forward RPC requests. This solution provides mechanisms on top of the existing DCE implementation to do optimal resource utilization. The steps described here represent the logic of how the overall scheme works. However, the specific implementation may differ slightly for various application related issues. For example, items indicated to be executed from the stub may actually be implemented in line; however, the overall flow would stay the same.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of integrating distributed computing environment (DCE) remote procedure calls (RPCs) with an advisory work load manager (WLM) to intelligently dispatch RPC requests among available server processes, the DCE including a plurality of coupled servers and at least one client which makes RPCs, the method comprising the steps of:

dynamically making routing decisions to one of a plurality of server processes based on interactions between a location broker and the advisory work load manager (WLM) to select a server according to performance and resource load balancing suitable to handle an RPC request and providing addressing information of the selected server to the location broker; and once an RPC request is assigned to a given server process, thereafter making RPCs directly to the selected server.

2. The method recited in claim 1 wherein the WLM interfaces with the servers through the location broker, the step of dynamically making routing decisions is based on data registered at the WLM comprising the steps of:

collecting data from servers that are running and data related to individual systems and workloads; and passing relevant data to the WLM by a server when the server is processing an RPC.

3. The method recited in claim 2 wherein the step of passing relevant data comprises the steps of:

receiving an RPC request invoked by a client;

informing the WLM about the RPC invoked by the client and any attributes associated with the RPC;

registering by the WLM attributes of the RPC and returning control to the server;

executing the RPC by the server and informing the WLM that the procedure has been executed; and returning control the client.

4. The method recited in claim 3 further comprising the step of the server registering itself with the WLM, which step of registering with the WLM comprising the steps of:

inquiring by the server from the WLM as to whether or not the server is managed by the WLM;

if the server is not managed by the WLM, continuing normal registration with the location broker by the server without registration with the WLM; and if the server is managed by the WLM, registering by the server with the WLM and the location broker.

5. A distributed computing environment (DCE) comprising:

a plurality of coupled application servers;

at least one client which makes remote procedure calls (RPCs);

a location broker interfacing with the plurality of application servers, said application servers being registered with the location broker;

an advisory work load manager (WLM) connected to the location broker for intelligently dispatching RPC requests among available application servers, the location broker accessing the WLM to dynamically make routing decisions to one of the application servers to select an application server according to performance and resource load balancing, to handle an RPC and providing addressing information of the selected application server to the location broker, and once an RPC is assigned to a selected application server, RPCs from a client are made directly to the selected application server.

6. The distributed computing environment recited in claim 5 wherein the application servers are also registered with the WLM.

* * * * *